Sept. 6, 1938.　　　K. SCHLESINGER　　　2,129,035
TELEVISION TRANSMITTER
Filed Nov. 1, 1935
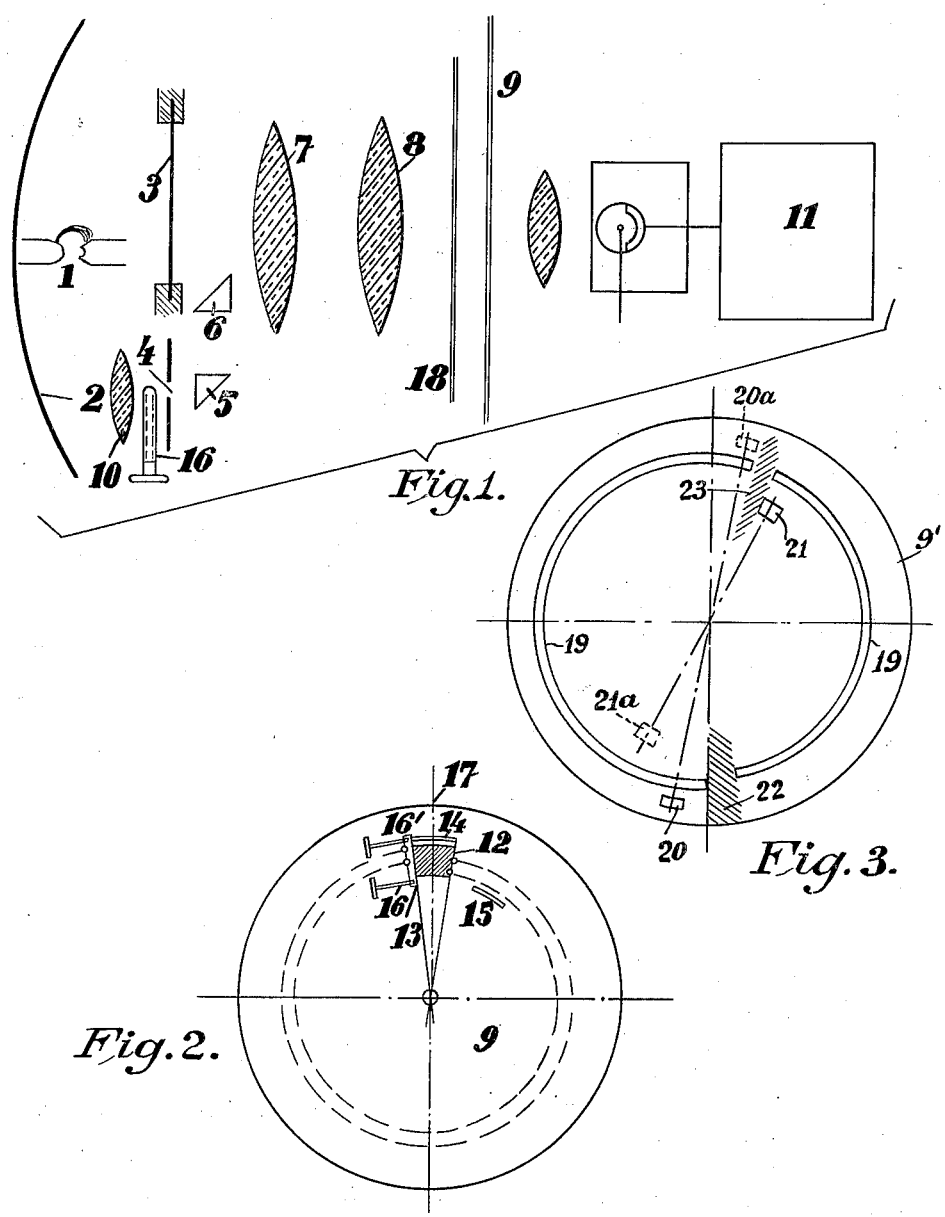
Inventor:
Kurt Schlesinger Patented Sept. 6, 1938

2,129,035

UNITED STATES PATENT OFFICE 2,129,035

TELEVISION TRANSMITTER

Kurt Schlesinger, Berlin, Germany, assignor to Radioaktiengesellschaft D. S. Loewe, Berlin-Steglitz, Germany Application November 1, 1935, Serial No. 47,789
In Germany November 2, 1934

1 Claim. (Cl. 178—7.1)

The present invention relates to a television transmitter according to the method of interlaced lines, which has already been described in principle in the application Ser. No. 36,008/35 and which produces the synchronizing impulses by an optical method.

The invention will be explained by means of the accompanying drawing, in which

Fig. 1 is a diagram showing a longitudinal section of the optical arrangement according to the invention, whilst Fig. 2 is a plane view of the scanning disc and Fig. 3 of the rotating diaphragm described in the specification.

In Fig. 1 there is illustrated a possible form of embodiment of the arrangement according to the invention. The light of the arc-lamp 1 is projected evenly by a hollow reflector 2 over the surface of the film 3 and a slotted diaphragm 4. The light passing through the latter is so deflected by means of two prisms 5 and 6 that the diaphragm 4 is reproduced sharply simultaneously with the film through the main lenses 7 and 8 on the screen of the Nipkow disc 9, so that it appears as a white margin 13 (Fig. 2) close to a vertical edge of the film image 12. By means of an auxiliary cylindrical lens 10, the light intensity passing the slot 4 is increased to such an extent that it by far exceeds all intensities passing the film 3.

According to the invention the two groups of signals for synchronization, viz., the line impulses and the image-change impulses are produced at the same amplitude by the following reasons. It has been found in practical operation that a "choking" of the amplifier 11 is not to be avoided when the image-change impulses possess a considerably greater amplitude than the line signals. The amount of current carried by these long signals is sufficient in order, by extensive charging of the coupling condenser of the amplifier 11, to cause a blocking of the same, which fades but slowly. A second interference in operation always exists when the method of production in respect of the two synchronization signals is not of such a kind that these signals are given completely independently of the image signals amplitude. Any superposition of the image and the synchronization signals must be avoided.

In Fig. 2 the Nipkow disc 9 is shown in a front view. It is provided with a double-spiral of apertures as described in the application Ser. No. 36,008/35. The spirals of this disc define a trapezoidal screen 12, at the edge of which the starting line 13 is projected with excessive brightness by means of the optical system illustrated in Fig. 1. According to the invention, the radial length of this starting line 13 is made to be greater than the height of the image area 12. The line impulses are, as well known, produced when the disc apertures pass the margin 13. Now to generate the image change impulses there are employed two tangential slits 14 and 15 which are arranged in the disc 9 outside of the area 12 but just within the starting line 13 which are displaced to one another to the extent of exactly the length of one half image line, and which possess a width sometimes larger than a scanning aperture, such as may be conveniently produced in a mechanical stamping operation.

When the image change slits 14 and 15 pass the extended starting line 13 there must impinge on the photo-cell, in accordance with the above, a very much greater amount of light than when a scanning aperture passes the starting line, as both the width of the starting line 13 as well as the height of the slits 14, 15 equal the width of several image points. There thus immediately would take place the described "choking" of the photo-amplifier 11. According to the invention this is avoided by a regulable weakening of the light of the starting line 13. In Fig. 1 there are shown two screws 16 (one covered by the other one), which may be turned into the path of light over the slotted diaphragm 4. The shadow of these screws appears, therefore, on the surface of the disc as 16 16', as shown in Fig. 2. In this way it is easily made possible to equal the potential of either of the long signals to that of the short signals. As addition to the described arrangement there must be employed a diaphragm, which is designated 18 in Fig. 1, synchronously rotating at half the circumferential velocity of the Nipkow disc 9.

Fig. 3 shows the form of the diaphragm. The diaphragm contains two spiral apertures 19, which serve to expose alternately one of the aperture spirals of the Nipkow disc. Further, it contains two windows 20 and 21 exposing alternately one of the apertures 14 and 15 (Fig. 2). (If the sequence of frame change impulses is desired to be reversed, the windows are to be placed at 20a and 21a.) The spokes 22 and 23, which connect the outer edge with the inner portion of the diaphragm, are preferably so disposed that the shadow formed by the same impinges on the disc following the passing of the windows 20, 21. In this way there occurs an automatic darkening of the later portions of the return line. It is sufficient if these spokes are two or three image points in width, inasmuch as the same are relieved mechanically in the case of a steady rotation. The spokes as shown apply to the first stated form of diaphragm. For the complementary diaphragm the spokes must be disposed behind the windows 20a, 21a. The distance of the diaphragm from the disc must be made as small as possible, as otherwise there will be loss of light and lack of sharpness of the shadows. The optical system according to the invention provides otherwise a guarantee for the accuracy of the signals by reason of the main Nipkow disc 9 alone, on which there is located the sharp optical reproduction. The diaphragm 18 has no influence on the accuracy of the signals, but has the function merely of a periodical covering for undesirable passage slots. The same, therefore, may be produced from a flexible material with comparatively small degree of accuracy, and is, therefore, more simple and cheaper than the Nipkow disc 9.

I claim:

In a television transmitter for transmitting film images according to the interlaced line method comprising a scanning disc provided with a spiral of apertures having two turns, a spiral aperture disc rotating at half the speed of the scanning disc and uncovering at once one of said apertures, a photo-cell arranged in operative relationship thereto, and means for projecting an image of the film to be transmitted onto said scanning disc; means for simultaneously projecting a light margin of great brightness onto said disc close to one radial edge of said image projection and outreaching said edge, two circumferential scanning slits in said disc having a tangential distance one from another corresponding to exactly the half of an image line and being arranged outside the area of the image projection so as to obtain frame change impulses by the same said photo-cell when said margin is passed by said slits, and two windows in said rotating diaphragm so arranged as to expose alternately one of said circumferential slits.

KURT SCHLESINGER.